United States Patent [19]

Jackel et al.

[11] 3,959,496

[45] May 25, 1976

[54] OXIDIZING AGENT FOR MAKING BREAD

[75] Inventors: Simon S. Jackel, Westport, Conn.;
Volodymyr R. Diachuk, Rutherford, N.J.

[73] Assignee: Baker Research Development Service, Inc., New York, N.Y.

[22] Filed: June 26, 1975

[21] Appl. No.: 590,555

Related U.S. Application Data

[63] Continuation of Ser. No. 424,785, Dec. 14, 1973, abandoned.

[52] U.S. Cl. .................................... 426/25; 426/62; 426/99
[51] Int. Cl.² ...................... A21D 2/22; A21D 2/04
[58] Field of Search ........................ 426/25, 62, 99

[56] References Cited
UNITED STATES PATENTS

| | | | |
|---|---|---|---|
| 2,511,803 | 6/1950 | Hall | 426/99 |
| 3,052,560 | 9/1962 | Delaney | 426/99 |
| 3,304,183 | 2/1967 | Johnston et al. | 426/25 |
| 3,666,486 | 5/1972 | Hodgson et al. | 426/99 X |
| 3,818,108 | 6/1974 | Morrison | 426/35 |

*Primary Examiner*—James R. Hoffman
*Attorney, Agent, or Firm*—Larson, Taylor and Hinds

[57] ABSTRACT

Ascorbic acid coated with an edible, water insoluble material is used as an oxidizing agent for bread. It may be used to replace conventional bromate and iodate oxidizing agents. Preferably, it is used with conventional bromate oxidizing agent to replace the conventional iodate oxidizing agent. It may be used as an oxidizing agent in any bread making process.

27 Claims, No Drawings

OXIDIZING AGENT FOR MAKING BREAD

This is a continuation, of application Ser. No. 424,785 filed Dec. 14, 1973 and now abandoned.

BACKGROUND OF THE INVENTION

This invention relates to bread making and, more particularly, to oxidizing agents useful in bread making.

For many years, oxidizing agents have been used to modify the protein in wheat flour to promote desired bread characteristics as large loaf volume, strong side walls, fine grain, smooth texture, and bright-white crumb color. These are used in all of the conventional methods of making bread including continuous mix, brew process, straight dough, sponge dough, and short-time dough processes. While many oxidizing agents have been used, the most widely used material is a mixture of potassium bromate and potassium iodate.

The use of iodate in bread has been criticized by several groups because of flavor problems and possible undesirable characteristics. Presently, the FDA permits a total of 77 ppm. (based on flour weight) of total bromate and iodate. In practice, bromate is used in an amount of from two to four times the amount of iodate.

Ascorbic acid has been described in U.S. Pat. No. 2,149,682, issued Mar. 7, 1939, as an oxidant capable of improving the baking strength of flour. However, the material was seen to be unstable, apparently due to the fact that, in marked distinction from earlier known oxidants, it is a strong reducing agent possessing the property of being easily decomposed by oxidation. U.S. Pat. No. 2,300,439, issued Nov. 3, 1942, shows one attempt at overcoming this problem in the use of ascorbic acid. More recently, in U.S. Pat. No. 3,304,183, issued to Johnson on Feb. 14, 1967, ascorbic acid is suggested as a reducing agent in continuous mix bread. However, it is there used for the purpose of reducing mixing time and a conventional bromate-iodate oxidizing agent is also employed. Johnson carefully points out that the action of ascorbic acid is totally different than the bromate or iodate oxidizing agents. In fact, Johnson discloses that the use of ascorbic acid as a replacement for bromate or iodate results in bread with inferior characteristics and that it is only when used with these agents that mixing time can be realized while producing bread of acceptable quality. We have discovered, quite surprisingly, that bromate or iodate oxidizing agent can be effectively replaced with ascorbic acid and that bread of excellent characteristics can be produced by continuous mix or by any other conventional bread making technique. Accordingly, it is an object of the invention to utilize ascorbic acid as an oxidizing agent for making bread by any conventional bread making process. It is a further object to replace iodate with ascorbic acid and produce bread by any conventional process with characteristics at least as good as those possessed by bread made in the same manner with iodate oxidizing agent.

BRIEF SUMMARY OF THE INVENTION

The foregoing objects and others which will be apparent to those having ordinary skill in the art are achieved according to the invention by utilizing finely divided particles of ascorbic acid coated with an edible, water insoluble material such as a hydrogenated vegetable oil. Preferably, at least 50 percent by weight of the coated particles have a size between 20 and 100 mesh. The ascorbic acid is incorporated in the bread dough in any convenient manner, preferably the conventional manner in which bromate or iodate oxidant is added in any given process.

DETAILED DESCRIPTION

Bread is conventionally made by any of several processes in each of which the present invention can be utilized. Conventional processes, all of which are fully described in the literature, include continuous mix, brew process, straight dough, sponge dough, and "short time" or "no time" processes utilizing biochemical development of the wheat flour dough. The use of the invention in each of these processes is illustrated in the Examples which follow.

EXAMPLE 1

Continuous Process.

The following ingredients are used for the broth (liquid ferment) preparation:

| | |
|---|---|
| Water: | variable (about 68.0%) |
| Sugar: | 8.0%* |
| Salt (enriched): | 2.25% |
| Soy-dairy blend: | 2.0% |
| Yeast food (Arkady) | 0.5% |
| Calcium Acid Phosphate | 0.1% |
| Calcium Propionate | 0.1% |
| Yeast | 2.5% |

*all percentages herein are based on the flour weight unless otherwise specified.

The broth is prepared in stainless steel tanks and it ferments for 2½ hours before use. At the end of the fermentation period, the broth is transferred to a reservoir tank. In this tank the temperature is maintained, while the broth is fed constantly and accurately through a plate type heat exchanger to the pre-mixer. At the same time, a Merchen Feeder continuously weighs flour which passes through a vibrating sifter and into the pre-mixer. An oxidant solution consisting of 50 ppm* potassium bromate and 12.5 ppm. potassium iodate is continuously metered directly from the tank into the pre-mixer. The oxidants may alternatively be added to the broth tank in tablet form.

*ppm. means parts by weight per million parts by weight of flour unless otherwise specified.

Blended liquid shortening is also metered into the pre-mixer. The above ingredients are metered into the pre-mixer at the rates pre-determined by the baker's formula which typically calls for:

100.00% of flour, and
3.0% shortening blend.

From the pre-mixer the thoroughly mixed ingredients are pumped to the developer. At the point of optimum development, when optimum film forming and gas retaining capacity is present, the dough is extruded, shaped, divided and placed in pans. It is ready for proofing and baking. The baked bread has excellent characteristics of loaf volume, side wall strength, grain texture, and crumb color and is of fully acceptable commercial quality.

EXAMPLE 2

Example 1 is followed except that the iodate is replaced by 12.5 ppm. of ascorbic acid in the form of coated particles. The coating is hydrogenated vegetable oil having a melting point of from 142°–148°F and having the following particle size distribution:

| | |
|---|---|
| Retained on 20 mesh (U.S. sieve) | 2% by weight (maximum) |

| | |
|---|---|
| Retained on 70 mesh | 60% by weight (minimum) |
| Through 100 mesh | 10% by weight (maximum) |

The coated ascorbic acid particles may be provided by any conventional encapsulation process such as the following:
1. U.S. Pat. No. 2,970,915 issued Feb. 7, 1961
2. U.S. Pat. No. 3,495,988 issued Feb. 17, 1970
3. U.S. Pat. No. 2,426,762 issued Sept. 2, 1947
4. U.S. Pat. No. 3,664,963 issued May 23, 1972
5. U.S. Pat. NO. 2,978,332 issued Apr. 4, 1961
6. Microencapsulation as disclosed in Food Technology, Nov. 1973, pages 34–44 and in the patents assigned to the National Cash Register Corporation.

The coated particles included about 50 percent by weight of the coating material. Bread made using 25 ppm. of the coated particles (12.5 ppm. ascorbic acid) in place of the 12.5 ppm. iodate used in Example 1 produced bread free of iodate and having virtually identical characteristics to the bread of Example 1. The loaf is in every way commercially acceptable.

EXAMPLE 3

Brew Process.

In this process, a brew is fermented for three or four hours or more at 87°F and kept overnight in the refrigerator. The next day, all the ingredients (brew flour, shortening, sugar, milk blend, salt, yeast food, and yeast) are mixed till optimum dough development. After that, the dough is allowed to rest for 10–45 minutes (floor time) then passed through the rounder and molder. Then it is proofed and baked. In this example, the brew has the following formula:

| | |
|---|---|
| Water | variable (20 or 30%) |
| Yeast | 1% |
| Sugar | 2% |
| Salt | 1.25% |
| Fleischmann's Diamalt | 0.5% |
| Fleischmann's Brew Buffer | 0.25% |

The dough has the following formula:

| | |
|---|---|
| Brew | All |
| Water | Variable (35–45%) |
| Flour | 100.0% |
| Sugar | 6.0% |
| Yeast Food (Fermaloid) | 0.5% |
| Salt | 0.75% |
| Yeast | 2.00% |
| Shortening | 3.0% |
| Milk Blend | 3.0% |

A conventional oxidizing agent comprising 6 ppm. bromate and 6 ppm. iodate are added prior to mixing. Some of the oxidizing agent is supplied in the yeast food which has the following composition (% based on weight of yeast food):

| | |
|---|---|
| Monocalcium Phosphate Monohydrate | 50.06% |
| Ammonium Sulphate | 7.01% |
| Potassium Iodate | 0.10% |
| Potassium Bromate | 0.12% |
| Sodium Chloride | 19.35% |
| Starch | 23.36% |

The bread made by this process has excellent, commercially acceptable characteristics.

EXAMPLE 4

The process of Example 3 is repeated except that the iodate (including that in the yeast food) is replaced with 12.5 ppm. ascorbic acid in the form of the coated capsules of Example 2. The bread produced without iodate has excellent, commercially acceptable characteristics in all respects comparable to the bread of Example 3.

EXAMPLE 5

Straight Dough Process.

The following ingredients are placed in a mixer and mixed to optimum development:

| | |
|---|---|
| Flour | 100.0% |
| Water (variable) | 60–68% |
| Sugar | 6.0% |
| Salt | 2.25% |
| Yeast Food | 0.5% |
| Shortening | 3.0% |
| Milk - Soy Blend | 3.0% |
| Yeast | 2.5% |

Then the dough is allowed to ferment for 1½ to 2 hours. Then it is divided, passed through an overhead proofer, rounded, and molded. Then it is ready for proofing and baking. The bread has excellent characteristics.

EXAMPLE 6

Bread is made as in Example 5 except that the iodate (including that in the yeast food) is replaced with 12.5 ppm. ascorbic acid as in Example 4. The bread produced without iodate has excellent, commercially acceptable qualities in all respects comparable to the bread of Example 5.

EXAMPLE 7

Sponge Dough.

Sponge ingredients are mixed for about 6 minutes and then allowed to ferment for 4 hours. Then the sponge dough is dropped to the dough mixer for remixing with the rest of the dough ingredients. After remix, the doughs are run through the degasser, divider, overhead proofer, rounder and molder. At this stage, pans with dough are placed in the proof box and then baked.

The sponge and dough formulas are as follows:

| Sponge | | Dough | |
|---|---|---|---|
| Flour | 62.5% | Flour | 37.5% |
| Water (variable) | 46.0% | Water | 22.0% |
| Yeast food | 0.5% | Sugar | 7.0% |
| Yeast | 2.5% | Shortening | 3.0% |
| | | Soy-Dairy Blend | .3.0% |
| | | Salt | 2.0% |
| | | Emulsifier | 0.2% |
| | | Inhibitor (Ca-propionate) | 0.1% |

The oxidizing aent ( 6 ppm. bromate and 6 ppm iodate) is incorporated in the yeast food of the sponge. The bread has excellent characteristics.

EXAMPLE 8

Bread is made as in Example 7 except that the iodate (including that in the yeast food) is replaced with 6 to 12 ppm. ascorbic acid as in Example 4. The bread produced without iodate has excellent, commercially acceptable qualities in all respects comparable to the bread of Example 7.

EXAMPLE 9

Short time or no time dough processes. The objective in these processes is to reduce or eliminate the bulk fermentation step in bread production for the purpose of savings in time, manpower and equipment. This is achieved by biochemical dough development. It's function is:

1. to ensure adequate gas production in the dough for proper leavening,
2. to contribute to flavor and aroma complex,
3. to promote dough development, and
4. to promote dough maturing action.

These functions require the use of special additives such as L-Cysteine Hydrochloride, correctly balanced ratios of yeast nutrients, oxidants and enzymes.

Standard formula and procedure for conventional or continuous processes are used where fermentation step would be shortened or eliminated. To obtain good quality, continuous or conventional no time bread with normal mixing and normal proof time, the following levels of oxidants may be used in accordance with the invention:

25–75 ppm. of potassium bromate
up to 200 ppm. of encapsulated ascorbic acid

Bread made in this manner in accordance with the invention has excellent characteristics.

The size of the coated ascorbic acid particles can vary widely. It will be recognized, however, that at the small levels of ascorbic acid used, a rather small particle size will be needed in order to achieve adequate distribution of the ascorbic acid in the bread dough. For this reason, it is preferred that at least 50 percent by weight of the particles will have a particle size of between 20 and 100 mesh (U.S. sieve size). More preferably, at least 75 percent will be between 20 and 100 mesh and, still more preferably at least 85 percent. The nature of the coating can vary widely. The coated particles are preferably added before mixing the dough or at least at one early stage of mixing to ensure adequate distribution. It is also believed that some rupturing of the coating during mixing is beneficial and, in fact, a good deal of the coating is apparently ruptured during mixing. The amount of rupturing will vary, of course, depending upon the hardness and thickness of the coating and these properties can be varied at will to achieve optimum results with any particular coating material. The coating should, of course, be edible and water insoluble and its only other requirement (other, of course, than being coatable by a known encapsulating technique) is that the coating be suitably frangible during the bread making process to make the ascorbic acid available. Since the mixing requirements of various bread making processes differ, and since the hardness of individual edible and water soluble coating materials will vary considerably, it is not feasible to place precise limits on the amounts of thickness of coating materials useful in the present invention. Fatty materials in general having a melting point of over 130°F, and hydrogenated vegetable oils having a melting point of from 130° to 155°F, preferably 140° to 150°F, in particular, have proven eminently useful and are easily coated by any of several conventional encapsulation techniques. For these materials, a coating amounting to about 100 percent by weight, based on the weight of the ascorbic acid, is typical. In general, a coating weight of from about 5 percent to 200 percent by weight, based on the ascorbic acid weight, will be sufficient depending, again, on the particular coating material.

The amount of ascorbic acid that may be used is generally up to 200 ppm., preferably from 5 to 200 ppm. based on flour weight. Bromate can be excluded altogether, but is preferably used in amounts of up to 75 ppm., more preferably 20–75 ppm. As mentioned above, the iodate is preferably excluded altogether but may be used in conventional amounts, generally one half to one fourth of the bromate and not to exceed 75 ppm. total bromate and iodate.

The ascorbic acid is conveniently utilized in admixture with bromate and added to the dough mix in the manner conveniently used for bromate addition. When used in this manner, the ascorbic acid is generally used in an amount of from about 0.04 to 8 parts of ascorbic acid per part by weight of bromate.

What is claimed is:

1. In a bread dough including wheat flour, water, leavening and an oxidizing agent, the improvement wherein said oxidizing agent comprises particles of ascorbic acid coated with and encapsulated within a coating of an edible, water insoluble material having a melting point of from 130°F to 155°F, said ascorbic acid being present in an amount of about 5 to 200 parts per million based on the weight of the wheat flour, said water insoluble material being present in an amount of about 5 to 200% by weight based on the ascorbic acid weight.

2. An improved dough according to claim 1 wherein said edible, water insoluble material comprises a triglyceride.

3. An improved dough according to claim 2 wherein said triglyceride comprises hydrogenated vegetable oil having a melting point of from 130°F to 155°F.

4. An improved dough according to claim 1 wherein at least 50% by weight of the coated ascorbic acid particles have a particle size of between 100 and 20 mesh.

5. An improved dough according to claim 4 wherein at least 75% by weight of the coated ascorbic acid particles have a particle size of between 100 and 20 mesh.

6. An improved dough according to claim 4 wherein at least 85% by weight of the coated ascorbic acid particles have a particle size of between 100 and 20 mesh.

7. An improved dough according to claim 1 wherein said oxidizing agent comprises potassium bromate in an amount of from 20 to 75 ppm. based on the wheat flour.

8. An improved dough according to claim 7 which is free of iodate oxidizing agent.

9. In a method of making leavened bread from a bread dough comprising wheat flour, water, leavening, and an oxidizing agent in which process the bread dough is baked to form a leavened bread, the improvement wherein said oxidizing agent comprises particles of ascorbic acid coated with and encapsulated within a coating of edible, water insoluble material having a melting point of from 130°F to 155°F, said ascorbic acid being present in an amount of about 5 to 200 parts per million based on the weight of wheat flour, said water insoluble material being present in an amount of about 5 to 200% by weight based on the ascorbic acid weight.

10. An improved method according to claim 9 wherein said edible, water insoluble material comprises a triglyceride.

11. An improved method according to claim 9 wherein said oxidizing agent comprises potassium bromate in an amount of from 25 to 75 ppm. based on the weight of the wheat flour.

12. An improved method according to claim 11 wherein the bread dough is free of iodate oxidizing agent.

13. An improved method according to claim 9 wherein the bread dough is prepared by a continuous mix process.

14. An improved method according to claim 13 wherein a broth is used to prepare the dough and wherein the oxidizing agent is added to the broth.

15. An improved method according to claim 9 wherein the bread dough is prepared by a brew process in which a fermented brew and all the remaining dough ingredients are mixed to optimum development.

16. An improved method according to claim 9 wherein the bread dough is prepared by a straight dough process wherein all of the dough ingredients are mixed and wherein the oxidizing agent is added to the dough prior to completion of the mixing step.

17. An improved method according to claim 9 wherein the bread dough is prepared by a sponge dough method wherein a fermented sponge is mixed with the remaining dough ingredients and wherein the oxidizing agent is added to the dough prior to the completion of the mixing step.

18. An improved method according to claim 9 wherein the bread is prepared by a short time dough process in which a bulk fermentation step is eliminated or shortened by the utilization of biochemical dough development and wherein the oxidizing agent is added to the dough prior to completion of mixing of the dough ingredients.

19. An oxidizing composition for use in bread making comprising an intimate mixture of potassium bromate particles and ascorbic acid particles, the ascorbic acid particles being coated with and encapsulated with an edible, water insoluble triglyceride having a melting point of about 130°–155°F, said ascorbic acid being present in an amount of about 0.04 to 8 parts by weight based on the weight of the potassium bromate, said triglyceride being present in an amount of about 5 to 200% by weight based on the ascorbic acid weight.

20. A composition according to claim 19 wherein at least 50 percent by weight of the coated ascorbic acid particles have a particle size of between 100 and 20 mesh.

21. A composition according to claim 20 wherein at least 75 percent by weight of the coated ascorbic acid particles have a particle size of between 100 and 200 mesh.

22. A composition according to claim 20 wherein at least 85 percent by weight of the coated ascorbic acid particles have a particle size of between 100 and 20 mesh.

23. An oxidizing composition according to claim 19 wherein said water insoluble triglyceride comprises hydrogenated vegetable oil.

24. In a bread dough including wheat flour, water, leavening and an oxidizing agent, the improvement wherein said oxidizing agent comprises particles of ascorbic acid coated with and encapsulated within an edible, water insoluble material having a melting point of at least 130°F to 155°F.

25. An improved bread dough according to claim 24 wherein said coating comprises hydrogenated vegetable oil.

26. In a bread dough including wheat flour, water, leavening and an oxidizing agent, the improvement wherein said oxidizing agent comprises potassium bromate particles and ascorbic acid particles, the ascorbic acid particles being coated with and encapsulated within an edible, water insoluble triglyceride having a melting point of about 130°–155°F, said ascorbic acid being present in an amount of about 0.04 to 8 parts by weight based on the weight of the potassium bromate, said triglyceride being present in an amount of about 5 to 200% by weight based on the ascorbic acid weight.

27. An improved bread dough according to claim 26 wherein said water insoluble triglyceride comprises hydrogenated vegetable oil.

* * * * *